(12) United States Patent
Ondrusek et al.

(10) Patent No.: US 7,321,897 B2
(45) Date of Patent: Jan. 22, 2008

(54) BINARY DEPENDENCY DATABASE

(75) Inventors: Bohus Ondrusek, Redmond, WA (US); Kevin Ward Burrows, North Bend, WA (US); Patrick Joseph Dinio Santos, Alexandria, VA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 10/763,505

(22) Filed: Jan. 22, 2004

(65) Prior Publication Data

US 2005/0165823 A1 Jul. 28, 2005

(51) Int. Cl.
G06F 7/00 (2006.01)
G06F 17/00 (2006.01)

(52) U.S. Cl. .................................. 707/102; 707/104.1

(58) Field of Classification Search ................ 707/102, 707/100, 1, 104.1
See application file for complete search history.

(56) References Cited

U.S. PATENT DOCUMENTS

| | | | |
|---|---|---|---|
| 5,812,850 A * | 9/1998 | Wimble ...................... | 717/131 |
| 6,247,173 B1 | 6/2001 | Subrahmanyam .............. | 717/9 |
| 6,374,403 B1 | 4/2002 | Darte et al. .................. | 717/161 |
| 2002/0161832 A1* | 10/2002 | Brebner ...................... | 709/203 |
| 2004/0046785 A1* | 3/2004 | Keller ......................... | 345/734 |
| 2004/0255272 A1* | 12/2004 | Ondrusek et al. ............ | 717/120 |
| 2005/0172306 A1* | 8/2005 | Agarwal et al. ............ | 719/328 |

OTHER PUBLICATIONS

Chen et al. "A Conponent Framework for Dynamic Reconfiguration of Distributed Systems" CD 2002, LNCS 2370, pp. 82-96.*

Xuejun Chen, "Dependence Managment for Dynamic Reconfiguration of COmponent-Based Distributed Systems" Proccedings of the 17th IEEE International Conference on Automated Software Engineering (ASE"02), 6 pages.*

Antoniol et al, "Library Miniturization Using Static and Dynamic Information" Proccedings of the International Conference on Software Maintenance (ICSM'03), 10 pages.*

Bixin Li, "Managing Dependencies in Component-Based Systems Based on Matrix Model", CWI, 12 pgs.

J. Henrard et al., "Program understanding in databases reverse engineering", Institut d'Informatique, University of Manur, Jan. 15, 1998, pp. 1-10.

Gyorgy Kovacs et al., "Designing Advanced Databases Using Dependency Graph Conducted Schema Transformation Algorithm", Dept. of Information Systems, University of Nijmegen, Technical Note CSI-N9703, Mar. 1997, pp. 1-14.

Philip Alan Stocks, "Applying formal methods to software testing", Dept. of Computer Science, The University of Queensland, Dec. 1993, pp. 1-180.

* cited by examiner

*Primary Examiner*—Sam Rimell
*Assistant Examiner*—Cory C. Bell
(74) *Attorney, Agent, or Firm*—Merchant & Gould P.C.

(57) ABSTRACT

The present invention facilitates the analysis of binaries, components, configurations, and their footprints for component design and optimization. Complete and meaningful binary, component, configuration, and footprint information allows formal methods for component analysis and configuration optimization. A binary dependency database persists and stores binary dependency information. The binary dependency database provides detailed dependency information among binaries.

25 Claims, 7 Drawing Sheets

Fig. 1

|  | kernel32.dll | ole32.dll | sxs.dll | user32.dll | advapi32.dll | rpcrt4.dll | ntdll.dll | gdi32.dll |
|---|---|---|---|---|---|---|---|---|
| kernel32.dll | 1 | 0 | 0 | 0 | 0 | 0 | 1 | 0 |

*Fig. 2*

|  | kernel32.dll | ole32.dll | sxs.dll | user32.dll | advapi32.dll | rpcrt4.dll | ntdll.dll | gdi32.dll |
|---|---|---|---|---|---|---|---|---|
| kernel32.dll | 1 | 0 | 0 | 0 | 0 | 0 | 1 | 0 |
| ole32.dll | 1 | 1 | 0 | 1 | 1 | 1 | 1 | 1 |
| sxs.dll | 1 | 0 | 1 | 1 | 1 | 0 | 1 | 0 |
| user32.dll | 1 | 0 | 0 | 1 | 0 | 0 | 1 | 1 |
| advapi32.dll | 1 | 0 | 0 | 0 | 1 | 1 | 1 | 0 |
| rpcrt4.dll | 1 | 0 | 0 | 0 | 1 | 1 | 1 | 0 |
| ntdll.dll | 0 | 0 | 0 | 0 | 0 | 0 | 1 | 0 |
| gdi32.dll | 1 | 0 | 0 | 1 | 1 | 0 | 1 | 1 |

| | kernel32.dll | ole32.dll | sxs.dll | user32.dll | advapi32.dll | rpcrt4.dll | ntdll.dll | gdi32.dll |
|---|---|---|---|---|---|---|---|---|
| kernel32.d | 1 | 0 | 0 | 0 | 0 | 0 | 1 | 0 |
| ole32.dll | 1 | 1 | 0 | 1 | 1 | 1 | 1 | 1 |
| sxs.dll | 1 | 0 | 1 | 1 | 1 | 1 | 1 | 0 |
| user32.dll | 1 | 0 | 0 | 1 | 1 | 0 | 1 | 1 |
| advapi32.d | 1 | 0 | 0 | 0 | 1 | 1 | 1 | 0 |
| rpcrt4.dll | 1 | 0 | 0 | 0 | 1 | 1 | 1 | 0 |
| ntdll.dll | 0 | 0 | 0 | 0 | 0 | 0 | 1 | 0 |
| gdi32.dll | 1 | 0 | 0 | 1 | 1 | 1 | 1 | 1 |

3rd

| | kernel32.dll | ole32.dll | sxs.dll | user32.dll | advapi32.dll | rpcrt4.dll | ntdll.dll | gdi32.dll |
|---|---|---|---|---|---|---|---|---|
| kernel32.d | 1 | 0 | 0 | 0 | 0 | 0 | 1 | 0 |
| ole32.dll | 1 | 1 | 0 | 1 | 1 | 1 | 1 | 1 |
| sxs.dll | 1 | 0 | 1 | 1 | 1 | 1 | 1 | 1 |
| user32.dll | 1 | 0 | 0 | 1 | 1 | 0 | 1 | 1 |
| advapi32.d | 1 | 0 | 0 | 0 | 1 | 1 | 1 | 0 |
| rpcrt4.dll | 1 | 0 | 0 | 0 | 1 | 1 | 1 | 0 |
| ntdll.dll | 0 | 0 | 0 | 0 | 0 | 0 | 1 | 0 |
| gdi32.dll | 1 | 0 | 0 | 1 | 1 | 1 | 1 | 1 |

4th

| | kernel32.dll | ole32.dll | sxs.dll | user32.dll | advapi32.dll | rpcrt4.dll | ntdll.dll | gdi32.dll |
|---|---|---|---|---|---|---|---|---|
| kernel32.d | 1 | 0 | 0 | 0 | 0 | 0 | 1 | 0 |
| ole32.dll | 1 | 1 | 0 | 1 | 1 | 1 | 1 | 1 |
| sxs.dll | 1 | 0 | 1 | 1 | 1 | 1 | 1 | 1 |
| user32.dll | 1 | 0 | 0 | 1 | 1 | 1 | 1 | 1 |
| advapi32.d | 1 | 0 | 0 | 0 | 1 | 1 | 1 | 0 |
| rpcrt4.dll | 1 | 0 | 0 | 0 | 1 | 1 | 1 | 0 |
| ntdll.dll | 0 | 0 | 0 | 0 | 0 | 0 | 1 | 0 |
| gdi32.dll | 1 | 0 | 0 | 1 | 1 | 1 | 1 | 1 |

4th adj.

| | kernel32.dll | ole32.dll | sxs.dll | user32.dll | gdi32.dll | rpcrt4.dll | advapi32.dll | ntdll.dll |
|---|---|---|---|---|---|---|---|---|
| kernel32.d | 1 | 0 | 0 | 0 | 0 | 0 | 0 | 1 |
| ole32.dll | 1 | 1 | 0 | 1 | 1 | 1 | 1 | 1 |
| sxs.dll | 1 | 0 | 1 | 1 | 1 | 1 | 1 | 1 |
| user32.dll | 1 | 0 | 0 | 1 | 1 | 1 | 1 | 1 |
| gdi32.dll | 1 | 0 | 0 | 1 | 1 | 1 | 1 | 1 |
| rpcrt4.dll | 1 | 0 | 0 | 0 | 0 | 1 | 1 | 1 |
| advapi32.d | 1 | 0 | 0 | 0 | 0 | 1 | 1 | 1 |
| ntdll.dll | 0 | 0 | 0 | 0 | 0 | 0 | 0 | 1 |

BINARY DEPENDENCY DATABASE

BACKGROUND OF THE INVENTION

Operating system configurations are composed of components that contain resources such as file and registry. Each component's footprint can be separated into two constituents: component resources and component dependencies. Footprint optimization faces many problems, including: packaging file/registry resources into components; satisfying required binary file dependencies; and modifying existing large binaries into several smaller ones.

Many operating systems targeted at embedded devices such as thin clients, retail point of sales, and set top boxes have limited space for storing the embedded OS, and the image size becomes crucial part of the final HW product cost. However, non-embedded devices, for which the image size is not a major issue, would benefit from a smaller OS images as well. A smaller OS image uses less memory, boots faster, exposes a smaller hacker attack surface area, and reduces the likelihood of servicing the image.

What is needed are tools and methods for analyzing binaries, components, configurations, and their footprints to help in component design.

SUMMARY OF THE INVENTION

The present invention is directed towards providing a foundation that facilitates the analysis of binaries, components, configurations, and their footprints to help in component design and optimization. Complete and meaningful binary, component, configuration, and footprint information helps to allow formal methods for component analysis and configuration optimization.

According to one aspect of the invention, a binary dependency database persists and stores binary dependency information. The binary dependency database provides detailed dependency information among binaries. The binary dependency database allows dependencies to be linked that may span across binaries or functions.

According to another aspect of invention, a method and system are directed to analyze binaries, components, and configurations and optimize their footprints meanwhile satisfying all their required dependencies.

According to yet another aspect of the invention, component verification and optimization tool are used by developers and testers for binary, component, and configuration footprint as well as dependency analysis. The optimization capability of the tool allows users to analyze proposed changes to binaries, components, and configurations in order to improve footprints against given constraints.

BRIEF DESCRIPTION OF THE DRAWINGS

FIG. 6 shows exemplary types of dependencies that a binary may be dependent on.

DETAILED DESCRIPTION OF THE PREFERRED EMBODIMENT

Illustrative Operating Environment

Figure 1:
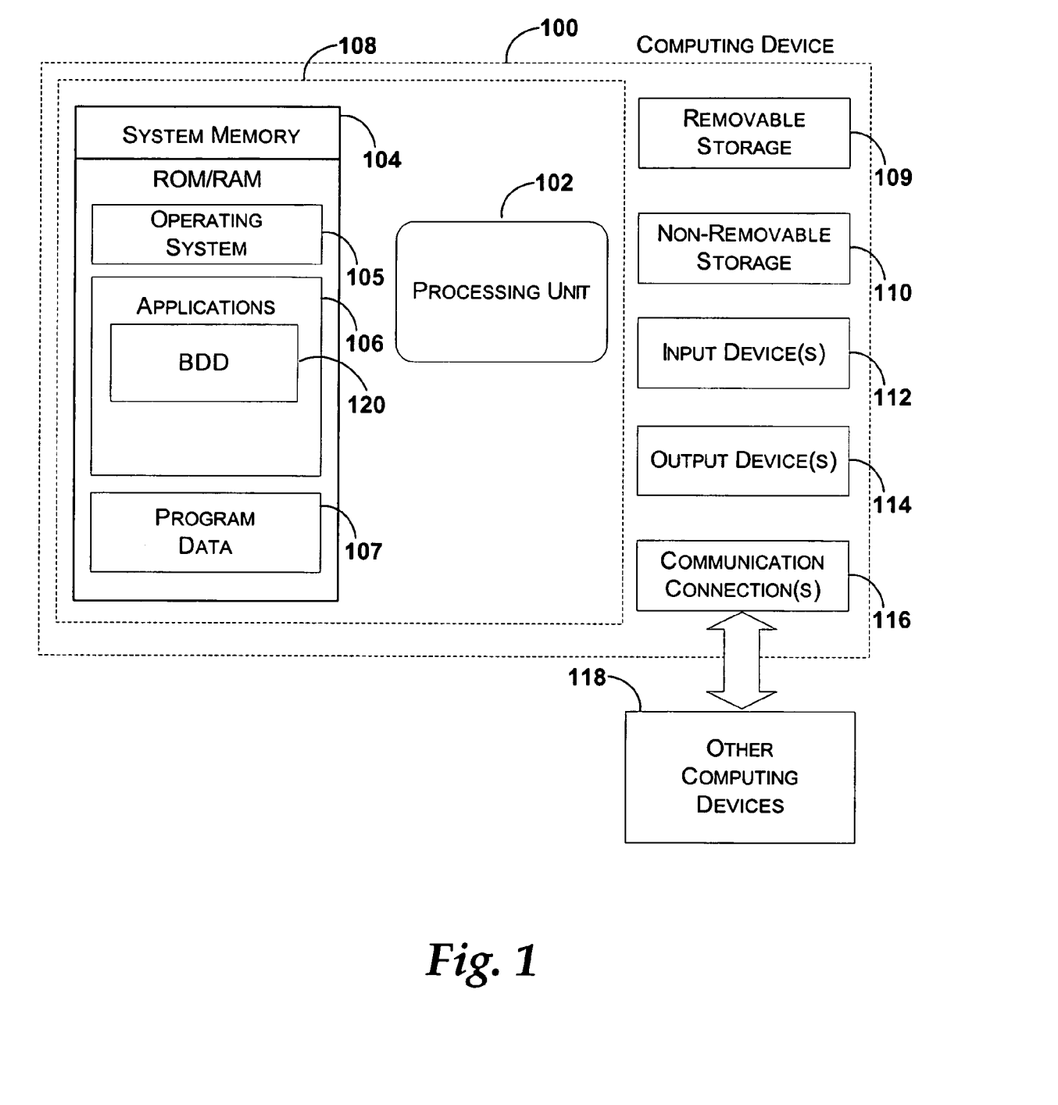
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include application 120 relating to a binary dependency database. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Binary Dependency Database

The present invention is directed to facilitate the analysis of binaries, components, and configurations by providing complete and meaningful information that will aid in component analysis and configuration optimization.

Table 1 illustrates an exemplary operating system repository that contains 11,069 files with total size of approximately 0.99 GB. As can be seen from Table 1, three specific file types, DLL, EXE and SYS, are responsible for the half of the repository size. There are 2943 (27%) repository files that have 17,849 dependencies of the following types: static; forward reference image; bound; delay load version 1; and delay load version 2.

In one exemplary repository it was found that approximately 95 of these dependencies are due to the three file types: DLL, EXE and SYS. There may also be dynamic dependencies among repository files that are created by using an API. For example, the following Win32 APIs may be used that create dynamic dependencies, including: LoadLibrary; CreateProcess; and CoCreateInstance. Other operating systems include other calls that create dynamic dependencies.

TABLE 1

Repository dissection by different file types

| File type | Total number of files | Total repository file size [MB] | Repository size ratio [%] | Average file size [kB] |
|---|---|---|---|---|
| DLL | 2176 | 386 | 39.0% | 182 |
| TTC | 6 | 63.4 | 6.4% | 10,820 |
| SYS | 663 | 61.7 | 6.2% | 95 |
| EXE | 452 | 47.4 | 4.8% | 107 |
| ICM | 243 | 40.2 | 4.1% | 169 |
| DIC | 11 | 36.4 | 3.7% | 3,389 |
| GPD | 1826 | 35.1 | 3.5% | 20 |
| PPD | 939 | 29.6 | 3.0% | 32 |
| CHM | 267 | 26.5 | 2.7% | 102 |
| TTF | 127 | 23.8 | 2.4% | 192 |
| INF | 691 | 21.3 | 2.2% | 32 |

Table 2 summarizes the dependency type breakdown of the dependencies listed in Table 1. Row#1 can be read as follows—there are 936 files in the example repository that have total of 2895 static dependencies on 135 distinct files; they account for 16.2% of all dependencies; all these dependencies are required.

TABLE 2

Binary file dependency types

| # of files | Dependency type | # of deps | Dependencies on # of distinct files | Fraction of all deps [%] | Required dependency |
|---|---|---|---|---|---|
| 936 | Static | 2895 | 135 | 16.2 | YES |
| 7 | Bound | 7 | 1 | 0.04 | YES |
| 2009 | Static + Bound | 12425 | 368 | 69.6 | YES |
| 1277 | Bound + Forward reference image | 1350 | 11 | 7.6 | YES |
| 462 | Static + Bound + Forward reference image | 479 | 8 | 2.7 | YES |
| 139 | Delay load version 2 | 504 | 119 | 2.8 | MAYBE |
| 26 | Delay load version 1 | 189 | 40 | 1.1 | MAYBE |

Note:
One file can have more than one dependency type.

All dependency types containing "static" or "bound" dependencies are required dependencies with respect to Windows OS, and they are responsible for 96.1% of all dependencies. Delay load dependencies can be either optional or required and are responsible for only 3.9% of all dependencies.

Dependency Type, Order and Strength

In some cases one binary will not relate to another just through single dependency type, order, or strength, and the relation will be more complex between two files in the system.

Let's consider first order dependencies. A first order dependency is a direct dependency relationship. For example, consider the following. Certmgr.dll directly depends on netapi32.dll through a static dependency, and it is importing only 4 functions out of a possible 331 functions exported by netapi32.dll. The strength of the bond between these two binaries is assessed to be 4/331, which is ~1.2%. However, certmgr.dll has also static dependencies on
    certcli.dll (strength=16/141~11.3%)
    shell32.dll (strength=4/754~0.5%)
    cryptui.dll (strength=9/48~18.8%)
    ntdsapi.dll (strength=4/96~4.2%)

All four of these files again directly depend on netapi32.dll. Therefore, certmgr.dll has also four second order dependencies on netapi32.dll. Moreover, certmgr.dll has also third and fourth order dependencies on netapi32.dll such as
    certmgr.dll→mfc42u.dll→winspool.drv→netapi32.dll
    certmgr.dll→advapi32.dll→secur32.dll→netapi32.dll
    certmgr.dll→oleaut32.dll→advapi32.dll→secur32.dll→netapi32.dll
    certmgr.dll→wintrust.dll→advapi32.dll→secur32.dll→netapi32.dll,
wherein "→" means depends on.

Since there are 176 repository files directly depending on netapi32.dll (150 through static and 26 through delay-load dependencies) the dependency of certmgr.dll on netapi32.dll will most probably grow through several more orders.

This example illustrates that dependency relations between two files can be more complicated than just a direct dependency. The dependency requirement, such as required vs. optional, will also be different along different dependency paths since some of the dependencies along the path are required (such as static) and some of them might be optional (such as delay loads). Given this complexity, it is useful to provide to developers the possible dependency paths between two specified binaries.

More dependency data regarding order, strength, and common functions called with a common dependency may also be generated to identify dependency orders, types, strengths, and any common functions between two binaries among all possible paths. Information like this will be used to determine the strength of the coupling between two binaries.

Binary Component, and Configuration Analysis

When analyzing existing binaries, components, and configurations or when making a new binary or component dependency it is useful to know what the dependency and footprint ramifications will be and what specific binaries, components and configurations will be affected throughout the dependency chain. Such information is not only useful with regards to the footprint but is also directly related to the functional testing of binaries, components and configurations.

Binary Dependency Chain Analysis

Table 3 illustrates exemplary binary dependency tree footprints as well as exemplary dependency. While only a number of dependencies and their total size is specified in this table, all dependencies, their sizes and footprint ratios are calculated to help identify the largest footprint files within the dependency chain.

TABLE 3

Binary dependency tree analysis

| Binary | Binary size [kB] | Binary component owner | # of binary deps. | Total binary dep footprint [kB] | Binary/ Total footprint [%] |
|---|---|---|---|---|---|
| Moviemk.exe | 789 | Windows Movie Maker | 121 | 48,139 | 1.6 |
| Wmpcore.dll | 1,272 | Windows Media Player 8.0 | 119 | 47,084 | 2.7 |
| Wmplayer.exe | 508 | Windows Media Player 8.0 | 118 | 47,599 | 1.1 |
| Msrating.dll | 129 | Internet Explorer | 109 | 43,588 | 0.3 |
| Srv.sys | 323 | File Sharing | 9 | 2,633 | 12.3 |
| Csrsrv.dll | 29 | Client/Server Runtime (Console) | 2 | 687 | 4.2 |

Therefore, when making a new dependency, e.g. to "msrating.dll", then there is a dependency on 109 binaries with total size of ~43 MB. However, "msrating.dll" belongs to the "Internet Explorer" component that is a fairly large component, 4.2 MB component itself and ~63 MB with its dependencies.

It is also useful to know what other binaries depend directly on a particular binary and throughout the whole dependency chain, and what components these binaries belong to. Such information is useful in determining how the binaries, components and their footprints will be affected by a code or dependency change in the binary in question.

In Table 4 below, three binaries on which most other binaries depend throughout the whole dependency chain are listed, as well as three randomly chosen binaries. According to one embodiment, binary sizes, components which own the depending binaries, and the component sizes are also displayed.

TABLE 4

Reverse binary dependency tree analysis

| Binary | Component Owner | # of binaries directly depending on the binary | Total # of binaries throughout the whole dependency chain depending on the binary |
|---|---|---|---|
| Ntdll.dll | Primitive: Ntdll | 1755 | 2219 |
| Kernel32.dll | Win32 API - Kernel | 2168 | 2203 |
| Msvcrt.dll | Microsoft Visual C++ Run Time | 1605 | 2121 |
| Clbcatq.dll | Primitive: Clbcatq | 6 | 15 |
| Comres.dll | Primitive: Comres | 20 | 36 |
| Csrsrv.dll | Client/Server Runtime (Console) | 4 | 4 |

It might be obvious to the owner of kernel32.dll that any change in footprint or dependency in this file will affect the whole operating system, but it might not be obvious to the owner of clbcatq.dll that a change in this binary will affect six (6) other binaries directly and total of fifteen (15) binaries both directly and indirectly. Analysis raises awareness among binary and component owners of their binary effect on other binaries and components throughout the system, as well as helping testers to identify areas of testing once there is a change in a particular binary.

Orphan binaries: These are binaries that do not depend on any other binaries and no other binaries depend on them.

Binary dependency clusters: A cluster is a set of binary files that depend on each other in a circular way virtually creating one large binary.

File resource packaging in components: Most components contain more than one file resource and it is useful to look at how to choose these resources for given components knowing the binary dependencies. Table 7 illustrates exemplary file resources of three components and their dependency tree sizes.

TABLE 7

Component file resources and their dependency tree footprints

| Component Name | File Resources | File sizes [kb] | # of deps | Size of dep chain [kb] | # of common deps | Binaries depending on file resources |
|---|---|---|---|---|---|---|
| Net.exe Utility | Net.exe | 39 | 110 | 43,626 | None | None |
| | Net1.exe | 113 | 110 | 43,700 | | |
| | Net.hlp | 101 | 1 | 0 | | |
| | Neth.dll | 248 | 1 | 0 | | |
| TCP/IP | Wshtcpip.dll | 17 | 110 | 43,605 | None | None |

TABLE 7-continued

Component file resources and their dependency tree footprints

| Component Name | File Resources | File sizes [kb] | # of deps | Size of dep chain [kb] | # of common deps | Binaries depending on file resources |
|---|---|---|---|---|---|---|
| Networking | Tcpip.chm | 50 | 1 | 0 | | |
| | Tcpip.sys | 320 | 7 | 2,547 | | |
| Client/Server Runtime (Console) | Winsrv.dll | 270 | 112 | 43,930 | Csrsrv.dll | Basesrv.dll, csrss.exe, winsrv.dll depend on csrsrv.dll |
| | Csrss.exe | 4 | 3 | 691 | Ntdll.dll | |
| | Csrsrv.dll | 29 | 2 | 687 | | |

Generally, help files in these components, such as *.hlp, *.chm, and *.cnt, are not much of interest since these files can be suppressed from being copied during building an image so they can be considered as optional. However, there are binaries that will not function properly when their help files are not present.

Configuration analysis: Many configurations will share many components due to the common dependencies; therefore, footprint of two configurations is not sum of their footprints, as it is in components only footprints, but is a union of the two configurations.

It is valuable to know what components and files compose specific configurations and what the footprint, component, and binary ramifications will be once two or more configurations are combined. There are two different scenarios shown in Table 8.

TABLE 8

Configuration-Component comparison

| Configuration | Size [MB] | # of components | # of common components | # of exclusive components |
|---|---|---|---|---|
| Minlogon | 10.5 | 38 | 36 | Primitive: Userenv Minlogon |
| Command Shell | 9.9 | 37 | | Command Shell |
| Command Shell | 9.9 | 37 | | Command Shell |
| Explorer Shell | 68.4 | 186 | 36 | 150 components |
| Config containing Notepad.exe | 72.6 | 186 | 146 | 40 components |
| Explorer Shell | 68.4 | 186 | | |

For example, a user wants to know what the Minlogon configuration footprint is, what components and files it contains, and what the ramifications will be once "Command Shell" configuration will be chosen for Minlogon. As Table 8 shows, these two configurations have 36 out of possible 38 components in common, and the footprint difference between Minlogon and Command Shell would be 0.6 MB. Minlogon configuration in fact has all the components required by Command Shell, except the Command Shell component itself. Moreover, if there is a need to add Notepad.exe to Minlogon configuration, the footprint will increase from ~10 MB to ~73 MB.

As a second example, one may be interested in choosing between Command Shell and Explorer Shell. From Table 8, it can be seen that the footprint difference, 55.5 MB, and the difference in number of components used by Command and Explorer shell configurations is significant.

It is interesting to note that five largest components in Minlogon and Command Shell configuration, out of all 38 and 37, respectively, are responsible for over 50% of total configuration footprints. In the "Explorer Shell" configuration, it is the largest 9 components, out of total 186, that are responsible for ~50% of total footprint, as can be seen in Table 9.

TABLE 9

Details of configuration footprints

| Configuration | Largest components within configuration | Size [bytes] | Ratio [%] |
|---|---|---|---|
| Minlogon | — | 11,048,945 | — |
| | Win32 API - User | 2,360,704 | 21.4% |
| | Win32 API - GDI | 969,088 | 8.8% |
| | Win32 API - Kernel | 926,720 | 8.4% |
| | NLS: Core Files | 728,733 | 6.6% |
| | Primitive: Ntdll | 674,304 | 6.1% |
| Command Shell | — | 10,391,163 | — |
| | Win32 API - User | 2,360,704 | 22.7% |
| | Win32 API - GDI | 969,088 | 9.3% |
| | Win32 API - Kernel | 926,720 | 8.9% |
| | NLS: Core Files | 728,733 | 7.0% |
| | Primitive: Ntdll | 674,304 | 6.5% |
| Explorer Shell | — | 68,528,592 | — |
| | Winlogon Support | 13,127,585 | 19.2% |
| | Primitive: Shell32 | 8,322,560 | 12.1% |
| | User Interface Core | 2,849,069 | 4.2% |
| | Win32 API - User | 2,360,704 | 3.4% |
| | Microsoft Foundation Class Library (MFC) | 1,990,767 | 2.9% |
| | Windows Logon (Standard) | 1,575,936 | 2.3% |
| | Local Security Authority Subsystem (LSASS) | 1,414,192 | 2.1% |
| | Primitive: Shdocvw | 1,338,880 | 2.0% |
| | Primitive: Ole32 | 1,141,248 | 1.7% |

The basis for formal methods is complete and accurate information. This means thorough knowledge of the relationships between all binaries that comprise software. According to one embodiment, this information is captured, persisted, updated, refined, and shared via a binary dependency database.

Binary, Component and Configuration Analysis Tool

Figure 2:
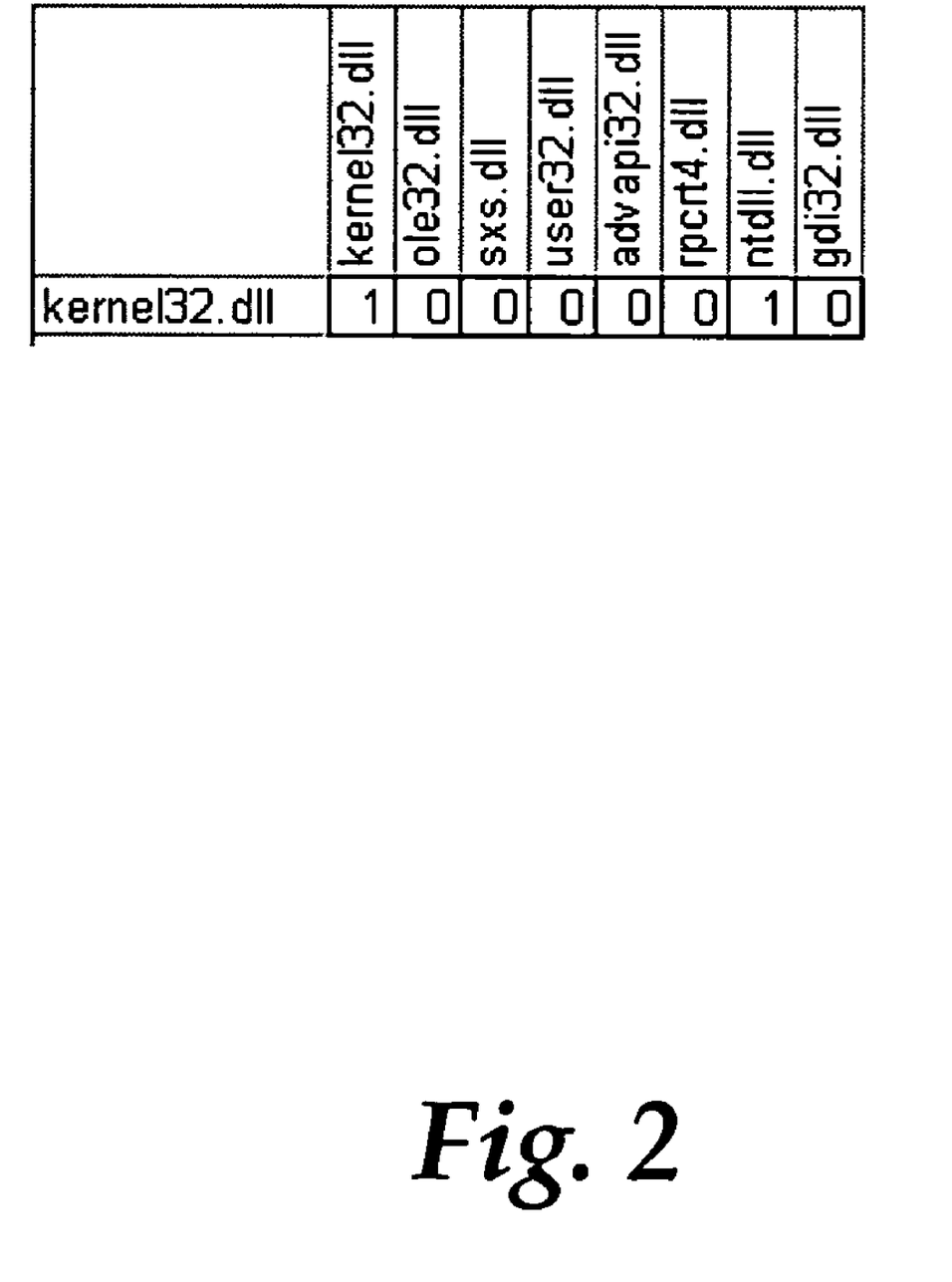
FIG. 2 illustrates a first order dependency vector.
Figure 3:
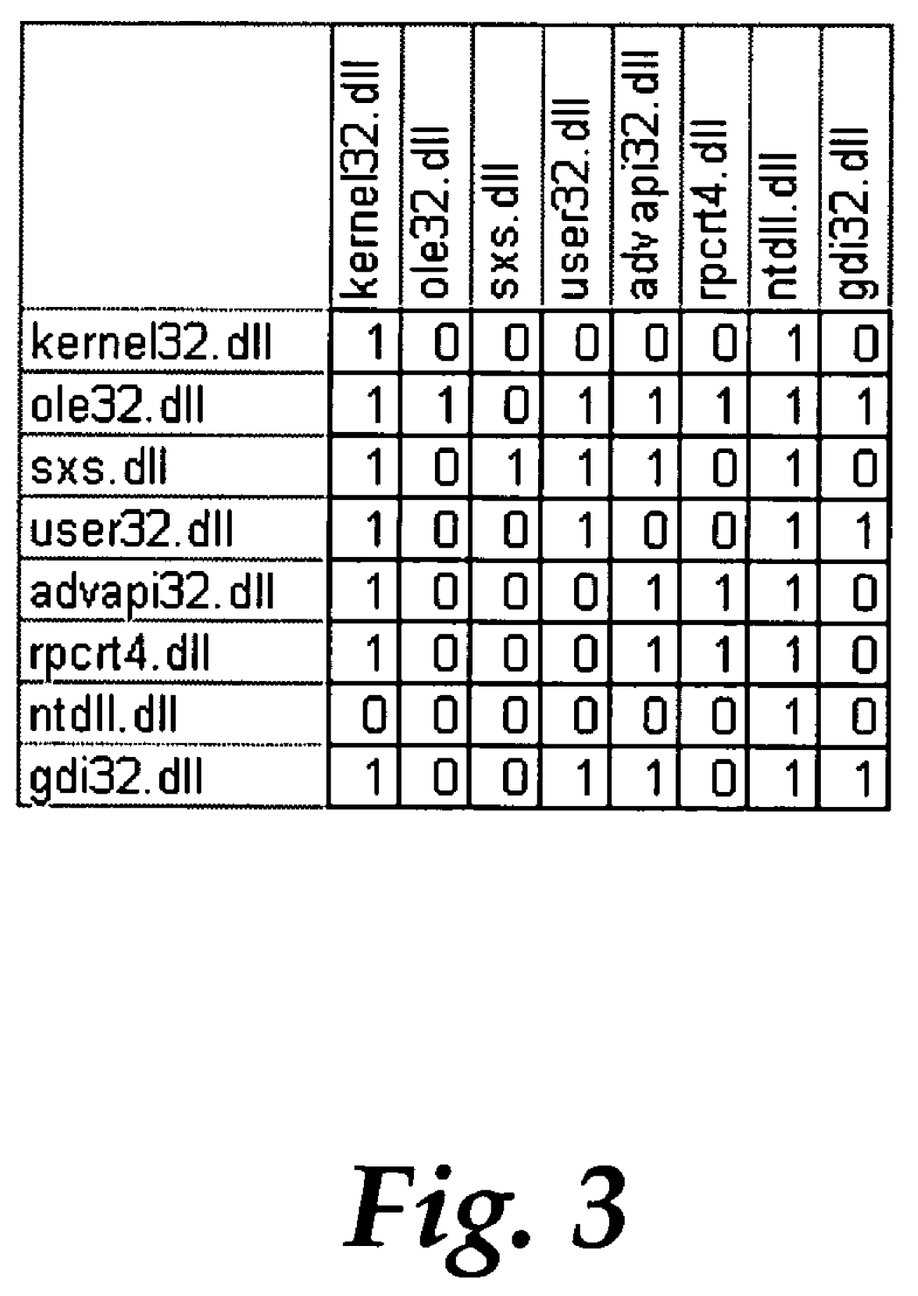
FIG. 3 illustrates a first order dependency matrix.
Figure 4:
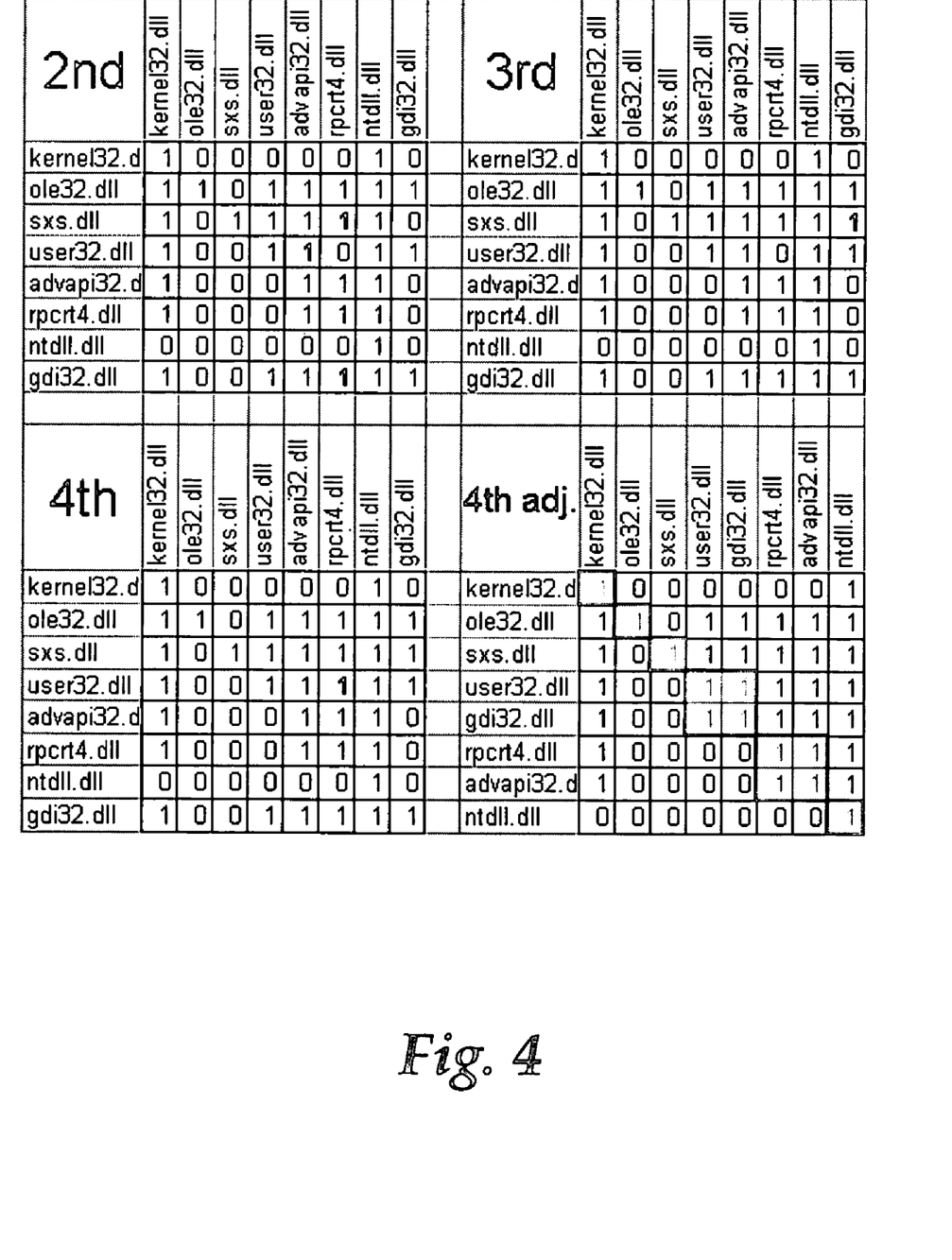
FIG. 4 shows exemplary $2^{nd}$, $3^{rd}$ and $4^{th}$ order dependency matrices.

FIGS. 2-4 illustrate identifying binary clusters and binaries related to clusters, by identifying common and exclusive binaries in multiple different dependency trees and identifying binaries depending on a specific binary through second (third, fourth, and so forth) order dependency.

FIG. 2 illustrates a first order dependency vector, in accordance with aspects of the invention. According to one embodiment of the invention, matrices for binary, component, and configuration analysis and their dependencies are used. Matrices have been used in analyzing and optimizing various types of problems such as marriage problem, transportation problems, spanning trees, and various network problems.

Consider the following vector (1,0,0,0,0,0,1,0) representing specific binary (i.e. kernel32.dll) direct dependencies, 1s representing dependencies and 0s representing non-dependencies.

Looking at the 0s and 1s in the vector, it can be identified that kernel32.dll depends on kernel32.dll and ntdll.dll and no other binaries. Once the same vector representation for the remaining seven binaries is performed, a square matrix can be generated as shown in FIG. 3.

FIG. 3 illustrates a first order dependency matrix, in accordance with aspects of the invention. The matrix provides additional information when its column vectors (binaries that depend on a specific binary) are examined.

Turning to FIG. 3 one can see that every single binary represented in this matrix depends on ntdll.dll since the column vector for ntdll.dll contains all 1s. The same information can be obtained by looking at the column vector of the specific binaries.

The elements of this dependency matrix are describing direct dependencies (i.e. first order dependencies) only. There are different ways to get nth order dependency matrix. Determine each binary's $n^{th}$ order dependencies and populate the matrix rows appropriately or multiply the matrix (n-1) times.

Since 0s and non-zeros are looked at according to one embodiment, it is not necessary to multiply the matrix in the mathematical sense but abort computation once the entry for a matrix element is or has reached a non-zero value.

FIG. 4 shows exemplary $2^{nd}$, $3^{rd}$ and $4^{th}$ dependency order matrices, in accordance with aspects of the invention.

Note the matrix elements in bold font; these are the elements that differ from the previous dependency order matrix elements. After the $5^{th}$ order dependency matrix was generated (not shown) no zero elements changed from the previous $4^{th}$ order dependency matrix. No changes indicate that the $4^{th}$ order dependency matrix is the final full dependency matrix. The rows of this matrix represent the full dependency lists of tree elements of the specific binaries representing the specific rows.

Further introducing a file size column vector S=(905, 1115, 633, 793, 990, 659) that represents sizes in kB of the binaries in the above matrix, one can determine the size of the dependency trees for all binaries in the above matrix by simply multiplying the above dependency matrix by the vector S; therefore D'·S (where D' is the reduced dependency matrix) will give us the sizes of all binary dependency trees for the binaries specified by rows of matrix D'. Note that the vector S size matches the size of D' in order for the inner product to make sense. D' can be any order dependency matrix and it can be used to compare how binary dependency tree footprints degrade once we go deeper into dependencies order (i.e. one can compare how footprint of the $1^{st}$ order binary dependency trees compare to the full order dependency trees).

The items discussed so far are just simple analysis of given designs such as given binaries, components and configurations. Optimization of the design discussed will now be discussed.

Binary, Component and Configuration Optimization Tool

Optimization results in the best design given certain constraints. Since there are typically thousands of binaries in the repository and about the same amount of components in the component database, it is not trivial to produce an optimal design. In order to proceed with the optimization work several types of constraints are identified. According to one embodiment, these include: number of binaries in the system; binary sizes; number of components in the database; component sizes; and configuration footprints.

Binary Dependency Database (BDD)

Figure 5:
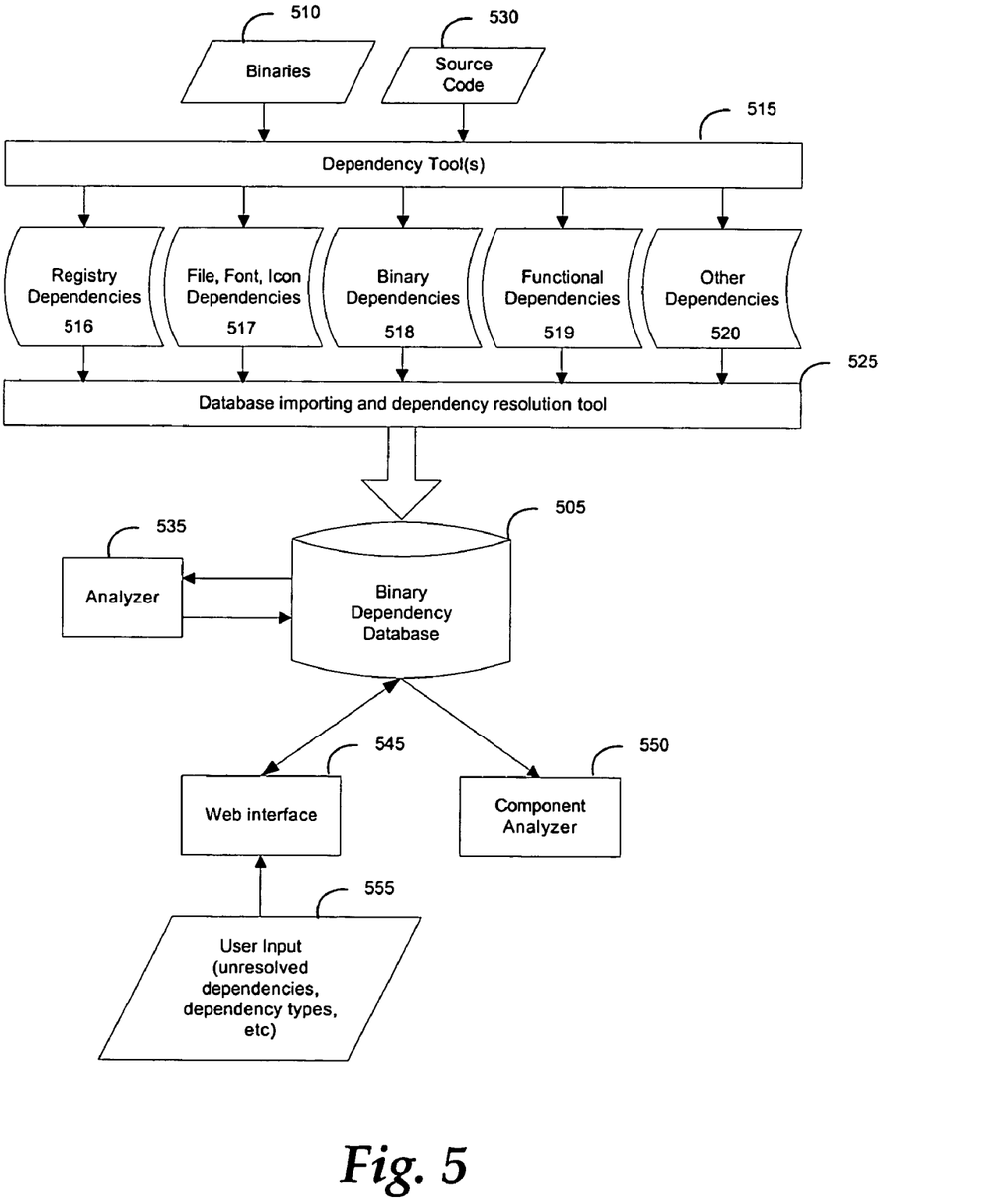
FIG. 5 illustrates a flow for creating the binary dependency database.

FIG. 5 illustrates a flow for creating the binary dependency database, in accordance with aspects of the invention. As illustrated, FIG. 5 includes binary dependency database (BDD) 505, binaries 510, dependency tool(s) 515, registry dependencies 516, file, font, icon dependencies 517, binary dependencies 518, functional dependenices 519, other dependencies 520, database importing and dependency resolution tool 525, web interface 545, component analyzer 550, analyzer 535, and user input 555.

BDD 505 receives information relating to dependencies 516-520 through tool 525. Dependency tool(s) are any tools that capture dependencies relating to binaries 510 and/or source code 530. Users may also input dependency information through user input 555 accessible using web interface 545. Dependency information may also be obtained during runtime of the binaries. Component analyzer 550 may be used by developers to analyze configuration designs and footprint analysis.

BDD 505 captures and persists the relationships between binaries 510 and provides a readily accessible dependency model of a software system.

According to one embodiment, binary dependency database 505 is separate and distinct from a component database (not shown) that ships with an operating system, such as Windows XPE. The component database represents an abstract, macro view of the OS and is defined in terms of components. Binary dependency database 505, in contrast, is a fundamental, micro view of the OS and is defined in terms of binary files and functions.

BDD 505 captures the relationships between the executable files (binaries 510) that comprise a software system. According to one embodiment, for every executable, the BDD contains the names of the files on which the executable depends but also detailed attributes of each dependency. The BDD also includes functions, as well as other files, upon which the executable depends. According to one embodiment of the invention, the BDD is stored in a SQL database. The BDD links dependency information between binaries that may span across binaries and functions. According to one embodiment, these dependency attributes include:

Dependency Category—Identifies the dependency relationships such as static, delay-load, dynamic (LoadLibrary, CoCreateInstance, CreateProcess), or registry.

Static dependencies are established when the executable is built and can be easily identified by inspecting the binary file. For example, if A.EXE statically links to B.DLL, then A.EXE is statically dependant on B.DLL. The static dependency is readily identified by inspecting the contents of A.EXE.

Delay-load relationships are a special kind of static dependency. They too are easily identified by inspecting the contents of A.EXE.

Dynamic dependencies are established at runtime and are more difficult to identify. For example, if A.EXE calls LoadLibrary ("B.DLL"), then A.EXE has a dynamic dependency on B.DLL.

A binary is considered dependent on a registry entry if it opens or appends a registry key, or queries or appends a registry value.

Dependencies 516-520 include many different dependency types upon which the binaries and functions within which the binaries may depend. According to one embodiment the dependencies are identified as optional or required. It is difficult to distinguish between optional and required dependencies. Whether the dependant is optional or required is determined by design rather than implementation. Therefore, the dependency type typically requires input from developers and program managers who can consult the appropriate design specification.

Dependency Strength is used to quantify the strength of the bond between two binaries. For example, if A.EXE imports two of the ten functions exported by B.DLL, then the dependency strength between A.EXE and B.DLL is 2/10, or 0.2.

BDD 505 is populated with data generated by the database importing and dependency resolution tool 525. The BDD is populated using static and dynamic dependency information and may be viewed using a web-based interface (545).

Binary Dependency Database Supporting Tools

Dependency tool(s) 515 output the static and dynamic, dependency information. According to one embodiment, tool 515 outputs not only the files that the binary depends on, but also the functions and registry data on which it depends.

Web-based database interface 545 has read/write access to binary dependency database 505. Analyzer 535 and component analyzer 550 are used to analyze data from BDD 505. According to one embodiment, the data output includes: Binaries dependent on the specified binary(s); Binaries the specific binary(s) depend on; Binary file and component $1^{st}$, $2^{nd}$, $3^{rd}$ ... $n^{th}$ order dependencies; the functions, files, registry data, and other dependencies within the system that the binary is dependent on; and the footprint growth comparison between different dependency orders taken into the account; Footprint comparisons and enumeration of optional vs. required binary dependencies; Orphan binaries; Unused DLL export functions; Component(s) and configuration(s) specified binary(s) belong to; Common and exclusive dependencies among specified binaries; Common and exclusive components across multiple configurations; Dependency strength between specified binaries; and Relative footprint ratio for binaries, components, and configurations.

Figure 6:
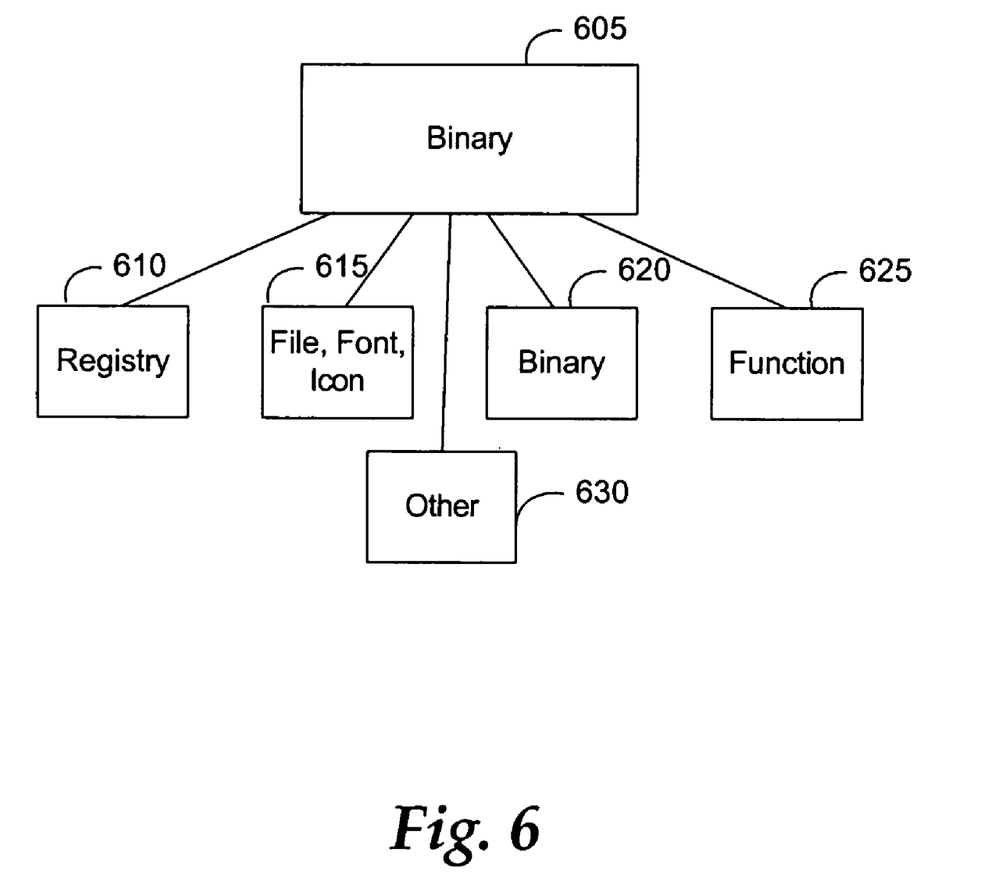

FIG. 6 shows exemplary types of dependencies that a binary may be dependent on, in accordance with aspects of the invention. As illustrated in FIG. 6, dependency information for binary 605 may be registry dependency information 610, file, font, icon information 615, binary information 620, function information 625, and other information 630.

The binary dependency database may store dependency information related to many different types of files. Registries can include dependencies relating to binaries. For example, a binary or binaries may depend on a key being contained within the registry. This dependency may be stored within the BDD. A binary may also depend on a specific file, icon, font or some other material being present. For example, a binary may have a dependency on a non-standard font. Binary 605 may also be dependent on binaries (620) and functions (625). Binary 605 may also be dependent on other information.

Figure 7:
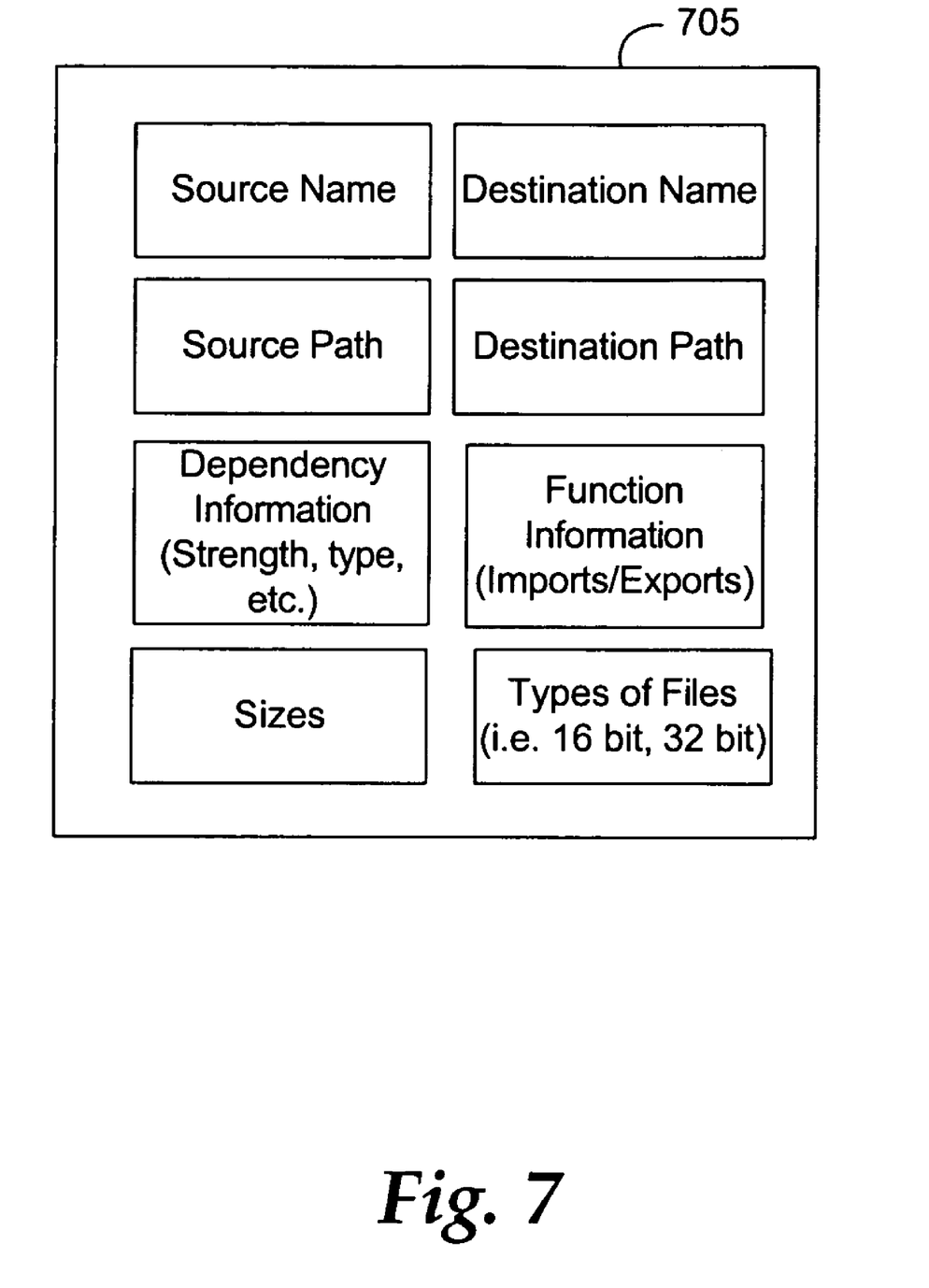
FIG. 7 illustrates exemplary information that is maintained by the binary dependency database, in accordance with aspects of the invention

FIG. 7 illustrates exemplary information that is maintained by the binary dependency database, in accordance with aspects of the invention. As illustrated, BDD 705 includes source and destination names, source and destination paths, dependency information, function information, size information, and type of file information.

A file may be known by many different names. For example, a file may have a source name on a distribution that is different than its name after it is installed (the destination name). Similarly, files may have the same name but be located under different paths on an installed image. For example, different DLLs may have the same name but be located at different paths. Without keeping track of the path information it would be difficult to know which file the binary is actually dependent on. Function information relating to the binaries is also maintained. For example, binary A may depend on functions F1, F2, F3, and F4 wherein F4 depends upon F2 located within Binary B. Maintaining the function information in addition to the binary dependencies further refines the dependency information. As a result, a developer could possibly include only a function from a binary instead of including the entire binary within a build.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for linking binary dependency relationships, comprising:
   obtaining dependency relationships relating to binaries; using a vector to represent dependency information for one of the binaries; wherein the dependency information relates to the dependency relationships for the one of the binaries; creating a dependency matrix comprising at least two of the vectors; obtaining a full dependency matrix and identifying binary circular dependency clusters; wherein obtaining the full dependency matrix comprises calculating a next order dependency matrix until the next order dependency matrix is the same a previous order dependency matrix;
   storing the dependency relationships within a binary dependency database; and
   providing dependency information relating to the binaries that links dependencies wherein some of the dependency information spans across the binaries and functions.

2. The method of claim 1, further comprising, classifying each of the dependency relationships into a dependency type.

3. The method of claim 2, wherein classifying each of the dependency relationships into the dependency type further comprise classifying the dependency type as a dynamic type when the dependency relationship is established at a runtime, and classifying the dependency type as a static type when the dependency relationship is established from inspecting the binaries.

4. The method of claim 2, further comprising determining a strength of a bond relating to the binaries.

5. The method of claim 4, using the full dependency matrix to identify the binary circular dependency clusters.

6. The method of claim 5, further comprising determining a likelihood of whether each of the dependency relationships is required.

7. The method of claim 4, further comprising performing analysis regarding a footprint associated with at least some of the binaries.

8. The method of claim 1, wherein the dependency matrix is an $n^{th}$ order dependency matrix.

9. The method of claim 1, wherein obtaining the dependency relationships relating to the binaries further comprises determining static and dynamic dependencies.

10. A system for linking binary dependency relationships, comprising:
a software system containing binaries;
a binary dependency database that is configured to store static and dynamic dependency relationships relating to the binaries; and
a processing tool that is configured to perform actions, including:
obtaining dependency relationships relating to the binaries; using a vector to represent dependency information for one of the binaries; wherein the dependency information relates to the dependency relationships for the one of the binaries; creating a dependency matrix comprising at least two of the vectors; obtaining a full dependency matrix and identifying binary circular dependency clusters; wherein obtaining the full dependency matrix comprises calculating a next order dependency matrix until the next order dependency matrix is the same a previous order dependency matrix;
storing the dependency relationships within the binary dependency database; and
providing dependency information relating to the binaries that links dependencies wherein some of the dependency information spans across the binaries and functions.

11. The system of claim 10, further comprising, classifying the dependency relationships into dependency types.

12. The system of claim 11, wherein the binary database further comprises a strength of a bond between the binaries.

13. The system of claim 12, wherein the processing tool further comprises performing an analysis regarding a footprint associated with the binaries.

14. The system of claim 11, wherein classifying the dependency relationships into the dependency type further comprises classifying the dependency type as a dynamic type when the dependency relationship is established at a runtime, and classifying the dependency type as a static type when the dependency relationship is established from inspecting the binaries.

15. The system of claim 14, further comprising using the full dependency matrix to identify the binary circular dependency clusters.

16. A computer-readable medium having computer executable instructions encoded thereon, the instructions being executed by a processor to provide the steps comprising:
obtaining dependency relationships relating to binaries; using a vector to represent dependency information for one of the binaries; wherein the dependency information relates to the dependency relationships for the one of the binaries; creating dependency matrix comprising at least two of the vectors; obtaining a full dependency matrix and identifying binary circular dependency clusters; wherein obtaining the full dependency matrix comprises calculating a next order dependency matrix until the next order dependency matrix is the same a previous order dependency matrix;
storing the dependency relationships within a binary dependency database; and
providing dependency information relating to the binaries that links dependencies wherein some of the dependency information spans across the binaries and functions.

17. The computer-readable medium of claim 16, further comprising, classifying the dependency relationships into a dependency type.

18. The computer-readable medium of claim 17, further comprising determining a strength of a bond between the binaries.

19. The computer-readable medium of claim 18, further comprising performing analysis regarding a footprint associated with specific binaries selected from the binaries.

20. The computer-readable medium of claim 17, wherein classifying each of the dependency relationships into the dependency type further comprise classifying the dependency type as a dynamic type when the dependency relationship is established at a runtime, and classifying the dependency type as a static type when the dependency relationship is established from inspecting the binaries.

21. The computer-readable medium of claim 18, wherein the dependency matrix is an $n^{th}$ order dependency matrix.

22. The computer-readable medium of claim 16, further comprising determining a likelihood of whether each of the dependency relationships is required.

23. The computer-readable medium of claim 16, wherein obtaining the dependency relationships relating to the binaries further comprises determining static and dynamic dependencies.

24. The system of claim 10, further comprising determining a likelihood of whether each of the dependency relationships is required.

25. The system of claim 10, wherein obtaining the dependency relationships relating to the binaries further comprises determining static and dynamic dependencies.

* * * * *